United States Patent
Guo et al.

(10) Patent No.: US 12,497,502 B2
(45) Date of Patent: Dec. 16, 2025

(54) REACTIVE ACRYLIC POLYOLEFIN BLENDS

(71) Applicant: Rohm and Haas Company, Collegeville, PA (US)

(72) Inventors: Hailan Guo, Warrington, PA (US); Morris Wills, Philadelphia, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 782 days.

(21) Appl. No.: 17/615,897

(22) PCT Filed: May 29, 2020

(86) PCT No.: PCT/US2020/035067
§ 371 (c)(1),
(2) Date: Dec. 2, 2021

(87) PCT Pub. No.: WO2020/263496
PCT Pub. Date: Dec. 30, 2020

(65) Prior Publication Data
US 2022/0315745 A1    Oct. 6, 2022

Related U.S. Application Data

(60) Provisional application No. 62/868,029, filed on Jun. 28, 2019.

(51) Int. Cl.
*C08L 23/0807* (2025.01)
*C08L 51/06* (2006.01)

(52) U.S. Cl.
CPC ........... *C08L 23/0815* (2013.01); *C08L 51/06* (2013.01); *C08L 2207/53* (2013.01)

(58) Field of Classification Search
CPC ...................................................... C08L 51/06
See application file for complete search history.

(56) References Cited

U.S. PATENT DOCUMENTS

| 4,269,749 | A | 5/1981 | Marriott et al. |
| 5,109,066 | A | 4/1992 | Ilenda et al. |
| 5,733,975 | A | 3/1998 | Aoyama et al. |
| 2018/0162990 | A1* | 6/2018 | Morley ............... C09B 67/0083 |

FOREIGN PATENT DOCUMENTS

| CN | 107828135 A | 3/2018 | |
| EP | 1217036 A1 | 6/2002 | |
| EP | 2123699 A1 | 11/2009 | |
| EP | 3369788 A1 * | 9/2018 | ............... C08F 2/22 |
| JP | 6299006 A | 10/1994 | |
| WO | 199804603 A1 | 2/1998 | |

* cited by examiner

*Primary Examiner* — Michael F Pepitone
(74) *Attorney, Agent, or Firm* — Warner Norcross + Judd LLP

(57) ABSTRACT

Disclosed is a composition comprising a polyolefin and a core-shell acrylic polymer comprising a crosslinked core and a shell comprising a branched polymer. The branched polymer is a reaction product of reactants comprising one or more monoethylenically unsaturated ester monomers, a chain transfer agent in an amount of 0.1 to 15 weight percent, and a crosslinker in an amount of 0.1 to 15 weight percent of a crosslinker, wherein weight percent is based on total amount of reactants, provided the amount of crosslinker is within +/−5 weight percent of the amount of chain transfer agent, and wherein the crosslinker comprises at least two carbon-carbon double bonds having different reactivity. A method for preparing the composition is also disclosed.

15 Claims, No Drawings

REACTIVE ACRYLIC POLYOLEFIN BLENDS

FIELD OF THE INVENTION

The field of this invention is polyolefin compositions and more specifically to polyolefins blended with reactive acrylic thermoplastics.

BACKGROUND

Polyolefin polymers are some of the most widely used plastics. Polyolefins are durable, heat resistant, and chemical resistant. Polyolefins find use as packaging materials, medical devices, roofing materials, water pipes, etc.

However, a major challenge presented by polyolefins is their low surface energy, which makes coating polyolefins or laminating polyolefins onto other plastics or substrates difficult. It is often desirable to coat, paint, or print directly on polyolefins, but the low surface energy makes such processes challenging. Various techniques exist for improving the low surface energy of polyolefins, such as the incorporation of additives or surface treatments that increase the surface energy of polyolefins. Some examples of surface treatment include, flame treatment, corona treatment, and plasma treatment. Such surface treatment methods require specialized equipment and increase the amount of processing necessary to coat a polyolefin article. The use of additives raises additional challenges. For example, some additives may migrate from the polyolefin matrix.

It would desirable to improve polyolefins in a manner that would address one or more of these issues.

SUMMARY OF THE INVENTION

Disclosed herein is a composition comprising a polyolefin polymer and a core-shell acrylic polymer comprising a crosslinked core and a shell comprising a branched polymer which is a reaction product of reactants comprising one or more monoethylenically unsaturated ester monomers, a chain transfer agent in an amount of 0.1 to 15 weight percent, and a crosslinker in an amount of 0.1 to 15 weight percent of a crosslinker, wherein weight percent is based on total amount of reactants, provided the amount of crosslinker is within +/−5 weight percent of the amount of chain transfer agent, and wherein the crosslinker comprises at least two carbon-carbon double bonds having different reactivity. The branched polymer is not cross-linked.

Also disclosed herein is a method of preparing the composition comprising blending the polyolefin polymer with the core-shell acrylic polymer.

DETAILED DESCRIPTION OF THE INVENTION

Disclosed herein is a composition comprising a polyolefin polymer and a core-shell acrylic polymer comprising a crosslinked core and a branched polymer comprising a crosslinker having at least two carbon-carbon double bonds having different reactivity. The inventors have surprisingly found that a branched polymer comprising a crosslinker having at least two carbon-carbon double bonds having different reactivity can produce a branched acrylic copolymer in which at least 80% of the pendent double bonds remain unreacted. The unreacted pendent double bonds on the shell of the core-shell acrylic copolymer allow the core-shell acrylic polymer to be grafted onto the backbone of a polyolefin polymer. This grafting allows the properties of the polyolefin polymer to be modified, which may allow the polyolefin polymer to be painted or printed without further modification.

The core-shell acrylic polymer comprises a crosslinked core and a shell comprising a branched polymer which is a reaction product of reactants comprising one or more monoethylenically unsaturated ester monomers, a chain transfer agent in an amount of 0.1 to 15 weight percent, and a crosslinker in an amount of 0.1 to 15 weight percent of a crosslinker, wherein weight percent is based on total amount of reactants, provided the amount of crosslinker is within +/−5 weight percent of the amount of chain transfer agent, wherein the crosslinker comprises at least two carbon-carbon double bonds having different reactivity. The core-shell acrylic polymer may be formed from a multi-stage sequential polymer composition comprising a first stage crosslinked acrylic polymer composition which forms a core, and an outer layer acrylic polymer composition which forms the shell.

The first stage, i.e., the core, is the reaction product of one or more monomers selected from the group consisting of alkyl acrylates and alkyl methacrylates with one or more crosslinking monomers, graft-linking monomers or combinations thereof. Preferably, the amount of units derived from the alkyl acrylate and/or alkyl methacrylate monomers is in the range of 95 to 99.9 weight percent of the first stage and the amount of units derived from the cross-linking monomer and/or graft linking monomers is 0.1 to 5 weight percent. Preferably, this first stage is cross-linked with a Tg in the range of −85 to −10° C.

The crosslinked core comprises 95 to 99.9 weight percent of units derived from one or more monomers selected from the group consisting of alkyl acrylate or alkyl methacrylate monomers. All individual values and subranges from 95 to 99.9 weight percent are included herein and disclosed herein; for example, the amount of units derived from one or more alkyl acrylate or alkyl methacrylate monomers can be from a lower limit of 95, 95.5, 96, 96,5, 97, 975, 98, 98.5, 99, or 99.5 weight percent to an upper limit of 95.3, 95.8, 96.3, 96.9, 97.5, 98, 98.7, 99.4 or 99.9 weight percent. For example, the amount of units derived from one or more alkyl acrylate or alkyl methacrylate monomers may be in the range of from 95 to 99.9 weight percent, or in the alternative, the amount of units derived from one or more alkyl acrylate or alkyl methacrylate monomers may be in the range of from 95 to 97.5 weight percent, or in the alternative, amount of units derived from one or more alkyl acrylate or alkyl methacrylate monomers may be in the range of from 97.8 to 99.9 weight percent, or in the alternative, the amount of units derived from one or more alkyl acrylate or alkyl methacrylate monomers may be in the range of from 96.5 to 97.9 weight percent.

The crosslinked core comprises from 0.1 to 5 weight percent of units derived from a cross-linking monomer, graft-linking monomer, or combination thereof. All individual values and subranges from 0.1 to 5 weight percent are included herein and disclosed herein; for example, the amount of units derived from cross-linking monomer, graft-linking monomer, or combination thereof can be from a lower limit of 0.1, 0.7, 1.2, 1.9, 2.6, 3.1, 3.7, 4.4, or 4.9 weight percent, to an upper limit of 0.2, 0.8, 1.4, 2.1, 2.7, 3.3, 3.8, 4.5 or 5 weight percent. For example, the amount of units derived from cross-linking monomer, graft-linking monomer, or combination thereof may be in the range of from 0.1 to 5 weight percent, or in the alternative, the amount of units derived from cross-linking monomer, graft-linking monomer, or combination thereof may be in the range of from 0.5 to 2.5 weight percent, or in the alternative, the amount of units derived from cross-linking monomer, graft-linking monomer, or combination thereof may be in the range of from 1.0 to 4.0 weight percent, or in the alternative, the amount of units derived from cross-linking monomer, graft-linking monomer, or combination thereof may be in the range of from 0.3 to 3.5 weight percent.

The crosslinked core has a Tg of from −85 to −10° C. All individual values and subranges from −70 to −10° C. are included herein and disclosed herein; for example, the Tg of the crosslinked core can be from a lower limit of −85, −80–70, −60, −50, −40, −30, −20, or −15° C. to an upper limit of −75, −65, −55, −45, −35, −25, −17 or −10° C. For example, the Tg of the crosslinked core may be in the range of from −85 to −10° C., or in the alternative, the Tg of the crosslinked core may be in the range of from −60 to −40° C., or in the alternative, the Tg of the crosslinked core may be in the range of from −70 to −50° C., or in the alternative, the Tg of the crosslinked core may be in the range of from −50 to −30° C.

For the above Tgs of copolymers may be calculated with the Fox equation [Bulletin of the American Physical Society 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC).

The alkyl of the alkyl acrylate or alkyl methacrylate in the crosslinked core may be a linear or branched alkyl group with 1 to 12 carbon atoms. Exemplary monomers include Exemplary useful alkyl groups include butyl acrylate, ethyl hexyl acrylate, ethyl acrylate, methyl methacrylate, butyl methacrylate, and iso-octylacrylate.

Examples of cross-linking and/or graft-linking monomers useful in the crosslinked core include, for example, butanediol diacrylate, butanediol dimethacrylate, ethylene glycol diacrylate, ethylene glycol dimethacrylate, divinyl benzene, diethylene glycol diacrylate, diethylene glycol dimethacrylate, diallyl maleate, allyl methacrylate, diallyl phthalate, triallyl phthalate, trimethylolpropane triacrylate, trimethylolpropane trimethacrylate blends thereof and combinations of two or more thereof.

Preferably, the alkyl of the alkyl acrylate or alkyl methacrylate in the crosslinked core is butyl acrylate (BA) and the crosslinker is allyl methacrylate (ALMA).

The second stage of the core-shell acrylic polymer comprises a branched polymer that is a reaction product of reactants comprising one or more monoethylenically unsaturated ester monomers, a chain transfer agent in an amount of 0.1 to 15 weight percent, and a crosslinker in an amount of 0.1 to 15 weight percent of a crosslinker, wherein weight percent is based on total amount of reactants.

Preferably, the chain transfer agent is present in an amount of at least 0.5 weight percent, at least 1 weight percent, at least 2 weight percent, or at least 3 weight percent. Preferably, the chain transfer agent is present in an amount less than or equal to 14 weight percent, less than or equal to 13 weight percent, less than or equal to 12 weight percent, less than or equal to 11 weight percent, or less than or equal to 10 weight percent.

The crosslinker in the branched polymer is a polyfunctional unsaturated monomer comprising at least two carbon-carbon double bonds having different reactivity. Preferably, the crosslinker is selected from allyl methacrylate, allyl acrylate, and combinations thereof. In allyl (meth)acrylate, the allyl group has a different reactivity than the vinyl group. Conventional crosslinkers, such as di(meth)acrylates, have carbon-carbon double bonds with identical reactivity. Using NMR spectroscopy, the inventors have found that the pendent double bonds using crosslinkers having identical reactivity are almost entirely reacted during polymerization to form branch points. The crosslinkers according to the present invention remain substantially unreacted, e.g., at least 80% of the pendent double bonds remain unreacted following polymerization. These unreacted pendent double bonds provide additional opportunity for further grafting.

The branched polymer is not crosslinked. To avoid crosslinking, the amount of crosslinker is within +/−5 weight percent the amount of chain transfer agent. Preferably, the amount of crosslinker is within +/−4 weight percent the amount of chain transfer agent. More preferably, the amount of crosslinker is within +/−3 weight percent the amount of chain transfer agent.

Surprisingly, the inventors have found that the amount of crosslinker may exceed the amount of chain transfer agent while still forming a branched polymer. Crosslinkers having functional groups with similar activity typically form crosslinked polymers when the amount of crosslinker in moles exceeds the amount of chain transfer agent in moles. According to the present invention, the amount of crosslinker in moles can exceed the amount of chain transfer agent without forming a crosslinked polymer.

Suitable monoethylenically unsaturated ester monomers useful in making the branched polymer can have the structure R'—C(O)O—R where R is a hydrocarbyl group (e.g. alkyl group or aryl group) and R' is a monoethylenically unsaturated aliphatic group having at least 2 or 3 carbon atoms. Preferably, R is an alkyl group of at least 1 or 2 or 3 carbon atoms. According to certain embodiments R is an alkyl group having no more than 12 or 10 or 8 or 6 or 5 carbon atoms. According to certain embodiments R is an aryl group of 6 to 12 carbon atoms. According to certain embodiments R' has no more than 6 carbon atoms. Examples of suitable monomers include methyl acrylate, butyl acrylate, ethyl hexyl acrylate, ethyl acrylate, methyl methacrylate, butyl methacrylate, cyclohexyl (meth)acrylate, cyclopentyl methacrylate, tetrahydrofurfyl methacrylate, and benzyl (meth)acrylate. Preferably, the monoethylenically unsaturated ester monomers are selected from methyl methacrylate and butyl methacrylate.

According to certain embodiments the branched polymer may comprise at least one additional monoethylenically unsaturated ester monomer. The additional monoethylenically unsaturated ester monomer may be selected to improve the compatibility of the core-shell acrylic polymer with the polyolefin. For example, the inventors have found that lauryl methacrylate (LMA) can improve the compatibility of the core-shell acrylic polymer when the polyolefin is selected from the INFUSE™ or ENGAGE™ polyolefin polymers available from The Dow Chemical Company. The additional monoethylenically unsaturated ester monomer (e.g., LMA) can be 0 or greater than 0, 1, 2, 3, 4, or 5 weight percent of the reactants and less than 20, 15, or 10 weight percent of the reactants.

According to certain embodiments one or more additional monounsaturated addition-polymerizable (e.g., monoethylenically unsaturated) monomers may be included. For example, styrene or acrylonitrile could be added. The amount of such additional monounsaturated addition-polymerizable monomer is preferably less than 10 or 5 weight percent based on weight of the reactants.

Preferably, the monoethylenically unsaturated ester monomer is present in the branched polymer in an amount of at least 65 weight percent based on the total weight of the reactants forming the branched polymer, such as, for example, at least 70 weight percent, at least 75 weight percent, at least 80 weight percent, at least 85 weight percent, or at least 90 weight percent.

The reactants for preparing the branched polymer further comprise a chain transfer agent (CTA). The chain transfer agent may be any compound known or found to be useful as a chain transfer agent in polymerization of acrylate or methacrylate monomers. For example, thiol chain transfer agents can be used. Examples of such thiol CTAs include monofunctional and polyfunctional thiols. Monofunctional thiols include, but are not limited to, propyl mercaptan, butyl mercaptan, hexyl mercaptan, octyl mercaptan, dodecyl mercaptan, thioglycolic acid, mercaptopropionic acid, alkyl thioglycollates, e.g. 2-ethyl hexyl thioglycollate or octylthioglycollate, mercaptoethanol, mercaptoundecanoic acid, thiolactic acid, and thiobutyric acid. Polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa(3-mercaptopropionate), and tripentaerythritol octathioglycollate. The use of polyfunctional thiols is a useful way to increase the degree of branching in the polymer. Optionally, the chain transfer agent may comprise a mixture of more than one type of compound. Preferably, the CTA is

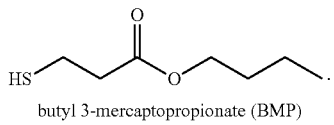
butyl 3-mercaptopropionate (BMP)

Alternative chain transfer agents may be any species known to reduce molecular weight in the conventional free-radical polymerization of vinyl monomers. Examples include sulphides, disulphides, halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as CoBF. Catalytic chain transfer agents may be used in relatively low concentrations compared to conventional thiol chain transfer agents, e.g. <0.5%, preferably <0.1% by weight (on monofunctional monomer), since they are generally highly effective at low concentrations. We have surprisingly found that catalytic chain transfer compounds based on cobalt complexes may be very effectively used at concentrations of less than 0.05% by weight (500 ppmw), e.g. 0.0001–0.01% by weight (1–100 ppmw) based on monofunctional monomer in the polymerization process of the present invention to give soluble branched polymers.

According to certain embodiments the cross linker is allyl methacrylate (ALMA), the chain transfer agent is BMP, and the monoethylenically unsaturated ester monomer is methyl methacrylate (MMA) or butyl methacrylate (BMA). Preferably, the MMA or BMA is present in amounts of from 80 to 98 weight percent, the amount of ALMA is in the range of 1 or 10 weight percent, and the amount of ALMA is in the range of 1 to 10 weight percent based on total weight of MMA or BMA, BMP and ALMA.

The branched polymer can be made using any free-radical polymerization method, e.g. solution, suspension, emulsion and bulk polymerization methods may all be used. For example, conventional emulsion polymerization may be used.

A surfactant or emulsifier may be used to form the branched polymer. Examples of emulsifiers include nonionic, anionic and cationic emulsifiers.

Suitable nonionic emulsifiers are araliphatic or aliphatic nonionic emulsifiers, examples being ethoxylated mono-, di-, and trialkylphenols (degree of ethoxylation: 3 to 50, alkyl radical: $C_4$-$C_{10}$), ethoxylates of long-chain alcohols (degree of ethoxylation: 3 to 100, alkyl radical: $C_5$-$C_{36}$), and also polyethylene oxide/polypropylene oxide homopolymers and copolymers. These may comprise the alkylene oxide units copolymerized in random distribution or in the form of blocks. Highly suitable are, for example, ethylene oxide/propylene oxide block copolymers. Preference is given to using ethoxylates of long-chain alkanols (alkyl radical $C_1$-$C_{30}$, average degree of ethoxylation 5 to 100) and, among these, particular preference to those having a linear $C_{12}$-$C_{29}$ alkyl radical and an average degree of ethoxylation of 10 to 50, and also ethoxylated monoalkylphenols.

Suitable anionic emulsifiers are, for example, alkali metal and ammonium salts of alkyl sulfates (alkyl radical: $C_8$-$C_{22}$), of sulfuric monoesters with ethoxylated alkanols (degree of ethoxylation: 2 to 50, alkyl radical: $C_{12}$-$C_{15}$) and with ethoxylated alkylphenols (degree of ethoxylation: 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{15}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192–208. Also suitable as anionic emulsifiers are bis(phenylsulfonic acid) ethers and their alkali metal or ammonium salts which carry a $C_4$-$C_{24}$ alkyl group on one or both aromatic rings. These compounds are common knowledge, from U.S. Pat. No. 4,269,749, for example, and are available commercially, in the form for example of Dowfax™ 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of N—$C_6$-$C_{29}$-alkylpyridines, -morpholines or -imidazoles, e.g., N-laurylpyridinium chloride.

The amount of emulsifier (or surfactant) can be at least 0.01 or 0.1 weight percent to 10 or 5 weight percent, based on the amount of monomers to be polymerized in the formation of the branched polymer.

Initiators may be used to form the branched polymer. Examples of initiators may be initiated by any suitable method of generating free-radicals such as by thermally induced decomposition of a thermal initiator such as an azo compound, peroxide or peroxyester. Therefore, the polymerization mixture also preferably contains a polymerization initiator which may be any of those known and conventionally used in free-radical polymerization reactions. Examples of azo initiators include azobis(isobutyronitrile) (AIBN), azobis(2-methylbutyronitrile), azobis(2,4-dimethylvaleronitrile), azobis(4-cyanovaleric acid). Examples of peroxide and peroxy initiators include hydrogen peroxide, sodium peroxide, potassium peroxide, t-butyl hydroperoxide, cumene hydroperoxide, dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate. Examples of additional initiators include ammonium and/or alkali metal persulfates, sodium perborate, perphosphoric acid and salts thereof, potassium permanganate, and ammonium or alkali metal salts of peroxydisulfuric acid, examples being alkali metal or ammonium peroxydisulfates, diacetyl peroxide, dibenzoyl peroxide, succinyl peroxide, di-tert-butyl peroxide, tert-butyl perbenzoate, tert-butyl perpivalate, tort-butyl peroxy-2-ethylhexanoate, tert-butyl permaleinate, cumene hydroperoxide, diisopropyl peroxydicarbamate, bis(o-toluoyl)peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidino-propane)dihydrochloride or 2,2'-azobis(2-methylbutyronitrile). Also suitable are mixtures of these initiators. As initiators it is also possible to use reduction/oxidation (i.e., redox) initiator systems. The redox initiator systems are composed of at least one, usually inorganic, reducing agent and one organic or inorganic oxidizing agent. The oxidizing component comprises, for example, the emulsion polymerization initiators already specified above. The reducing component comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems can be used along with soluble metal compounds whose metallic component is able to occur in a plurality of valence states. Typical redox initiator systems are, for example, ascorbic acid/iron(II)sulfate/sodium peroxodisulfate, tert-butyl hydroperoxide/sodium disulfite, tert-butyl hydroperoxide/Na hydroxymethanesulfinate. The individual components, the reducing component for example, may also be mixtures, an example being a mixture of the sodium salt of hydroxymethanesulfinic acid and sodium disulfite.

The amount of initiator is generally at least 0.01 or 0.05 or 0.01 weight percent to 10 or 5 or 3 weight percent based on all of the monomers to be polymerized.

The branched polymers are not cross-linked. For example, this can be demonstrated by evaluating the solubility of the polymers in a solvent such as tetrahydrofuran. A cross-linked polymer will not be soluble.

The branched polymers according to certain embodiments can be characterized by a polymer branching ratio, g', of less than 1, 0.95, 0.9, 0.8. According to some embodiments g' is at least 0.5 or 0.6 or 0.7. The polymer branching ratio (g') is calculated by comparing measured the intrinsic viscosity of the branched polymer ($[\eta]_{branched}$) at each elution volume increment to the intrinsic viscosity of the linear polymer ($[\eta]_{linear}$) with the same molecular weight (M) (Eq. 1) in gel permeation chromatography (GPC) analysis. For a linear polymer, g' value equals to 1 and, for a branched polymer, g' is smaller than 1.

$$g' = \left(\frac{[\eta]_{branched}}{[\eta]_{linear}}\right)_M \quad \text{(Eq. 1)}$$

Molecular Weight Analysis: The polymer absolute molecular weights ($M_w$, $M_n$), PMMA relative molecular weights ($M_{w\_PMMA}$, $M_{n\_PMMA}$), intrinsic viscosity ($[\eta]_w$, $[\eta]_n$), and branching ratio (g') can be measured by gel permeation chromatography with online multi-angle light scattering (MALS) detector, viscometer (VS), and differential refractive index (dRI) detector. For example, the GPC instrument setup can include an Agilent 1200 series HPLC system (degasser, pump, autosampler and column oven), a Wyatt HELEOS II MALS detector, a Wyatt ViscoStar II viscometer, and a Wyatt T-rEX dRI detector. The polymer separation can be carried out on a column set e.g. having two PLgel mixed B LS columns (10 μm particle size, 7.5×300 mm length) using tetrahydrofuran (THF) as the mobile phase at a flow rate of 1 mL/min. Column oven temperature is set at 30° C. A set of 10 points PMMA standards (Agilent EasiCal PM-1) is used to calibrate the GPC columns and provide the PMMA-relative molecular weight. The absolute molecular weights are obtained from the MALS detection using Zimm formalism and the intrinsic viscosity data are obtained from the viscometer. High molecular weight fractions data (PMMA-relative molecular weight larger than 6500 Da) are used to calculate average g' values. For consistency of g' calculation, a linear PMMA model from Mark-Houwink equation (Eq. 2, where K=0.0383 mL/g and α=0.581 for non-BA containing samples in Table 2 and K=0.03044 mL/g and α=0.615 for BA containing polymers in Table 2) is used to obtain the ($[\eta]_{linear}$) in Eq. 1 using the M data from MALS detection.

$$[\eta]=KM^\alpha \quad \text{(Eq. 2)}$$

The weight average molecular weight, $M_w$, as measured by GPC of the branched polymer is according to certain embodiments in the range of at least 2,500 or 3,000 or 5,000 or 10,000 or 20,000 or 25,000 g/mol. According to certain embodiments weight average molecular weight is no more than 75,000 or 50,000 g/mol. The number average molecular weight, $M_n$, of the branched polymer as measured by GPC according to certain embodiments is at least 1,250 or 1,500 g/mol. According to certain embodiments the number average molecular weight is no more than 6,000 or 5,000 or 4,500 g/mol.

According to certain embodiments the branched structure is a dendritic structure.

The branched polymer may comprise 20 to 80 weight percent of the total weight of the core-shell acrylic polymer. Preferably, the branched polymer comprises at least 30 weight percent, at least 45 weight percent, or at least 50 weight percent of the total weight of the core-shell acrylic polymer. Preferably, the branched polymer comprises less than or equal to 70 weight percent, less than or equal to 60 weight percent, or less than or equal to 55 weight percent of the total weight of the core-shell acrylic polymer. More preferably, the branched polymer comprises about 50 weight percent of the total weight of the core-shell acrylic polymer.

The core-shell acrylic polymer may be dried, e.g., freeze dried, or coagulated, e.g., calcium chloride coagulation prior to forming the composition with the polyolefin polymer.

The amount of core-shell acrylic polymer in the composition may be at least 10 weight percent based on the total weight of the core-shell acrylic polymer and the polyolefin polymer. Preferably, the amount of core-shell acrylic polymer in the composition may be at least 20 weight percent based on the total weight of the core-shell acrylic polymer and the polyolefin polymer. More preferably, the amount of core-shell acrylic polymer in the composition may be at least 25 weight percent based on the total weight of the core-shell acrylic polymer and the polyolefin polymer. Even more preferably, the amount of core-shell acrylic polymer in the composition may be at least 30 weight percent based on the total weight of the core-shell acrylic polymer and the polyolefin polymer. The amount of core-shell acrylic polymer in the composition may be less than or equal to 60 weight percent based on the total weight of the core-shell acrylic polymer and the polyolefin polymer. Preferably, the amount of core-shell acrylic polymer in the composition may be less than or equal to 50 weight percent based on the total weight of the core-shell acrylic polymer and the polyolefin polymer. Preferably, the amount of core-shell acrylic polymer in the composition ranges from 30 to 50 weight percent based on the total weight of the core-shell acrylic polymer and the polyolefin polymer.

The polyolefin polymer may be selected from, for example, homopolymers or block or random polyolefin copolymers. Preferably, the polyolefin polymer is a block copolymer. The polyolefin polymer may comprise, for example, polyethylene, polypropylene, polybutylene, etc., and may also include copolymers of one or more of hexene, octene, decene, etc. Preferably, the polyolefin is an ethylene-octene copolymer such as an INFUSE™ or ENGAGE™ polyolefin copolymer available from The Dow Chemical Company.

The composition may be made by blending the components. According to one embodiment, the components can be blended by a two-roll mill.

In certain embodiments, the composition may further comprise a high temperature thermal organic peroxide. As used herein, the term "high temperature thermal organic peroxide" refers to a thermal organic peroxide having a 1 hour half life at a temperature below the melt processing temperature of the composition.

One example of a high temperature thermal organic peroxide is Luperox® 101 (2,5-Bis(tert-butylperoxy)–2,5-dimethylhexane), which has a 1 hour half-life at 140° C. The high temperature thermal organic peroxide may be preblended with the core-shell acrylic polymer before the core-shell acrylic polymer is blended with the polyolefin polymer. When a high temperature thermal organic peroxide is used, the core-shell acrylic polymer may be crosslinked with the polyolefin polymer by blending at high temperatures, such as, for example, by reactive extrusion.

The blended polymer, in which the core-shell acrylic polymer may be chemically grafted onto the polyolefin backbone, may exhibit mechanical integrity, indicating that the core-shell acrylic polymer is compatible with the polyolefin polymer. The resulting blended polymer is preferably paintable or printable without further modification required.

The composition may further comprise additional additives as are desired for the final product. Examples of such additives include UV light stabilizers and antioxidants. According to certain embodiments that additives are selected such that the composition remains transparent. Examples of UV light stabilizers include benzophenones, benzotriazoles, triazines, benzoxazinones, hindered amine light stabilizer (HALS) and hindered benzoates. Commercially available UV and light stabilizers are exemplified by Cyasorb Light Absorbers, and Light Stabilizers, and Cyasorb Cynergy Solutions from Solvay, TINUVIN FROM BASF, LowLite from Chemtura, OnCap from PolyOne, and Light Stabilizer 210 from E. I. du Pont de Nemours and Company of Delaware, U.S.A. Examples of antioxidants include phenolic antioxidants, and combinations of phenolic antioxidants with phosphites, thioethers or organic sulfides. Phenolic antioxidants include fully sterically hindered phenols and partially hindered phenols; and sterically hindered amines such as tetramethyl-piperidine derivatives. Suitable phenolic antioxidants include vitamin E and IRGANOX™ 1010 from BASF. IRGANOX™ 1010 comprises pentaerythritol tetrakis(3-(3,5-di-t-butyl-4-hydroxyphenyl)propionate). Additional examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, *Camellia sinensis* oil, chitosan ascorbate, chitosan glycolate, chitosan salicylate, chlorogenic acids, cysteine, cysteine HCl, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (*Melaleuca* aftemifolia) oil, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof. According to certain embodiments the total amount of additives used (if any) is less than 10 or 5 or 3 weight percent based on total weight of the composition.

EXAMPLES

Synthesis and Analysis of Branched Polymer

Emulsion polymerization was carried out in a 5 liter 4-necked round bottom flask equipped with a mechanical stirrer, heating mantel, thermometer, temperature controller and Na inlet. To the reactor was charged 1530 parts of deionized water, 54.55 parts of Na-dodecyl benzene sulfonate surfactant (DS-4, 22% in water), 0.146 parts of $FeSO_4$ and 0.16 parts of acetic acid. The contents of the reactor were heated to 60° C. with an Na sweep. A monomer emulsion was prepared in a separate container with 234 parts of deionized water, 18.18 parts of DS-4 surfactant (22% in water), 53 parts of allyl methacrylate (ALMA), 696 parts of methyl methacrylate (MMA), and 52 parts of butyl 3-mercaptopioante (BMP). Mechanical agitation was applied to effect emulsification. The total of the monomer emulsion was 1000 parts. The redox initiator system consists of 2 separate solutions. The first is a 3% (by weight) solution of t-butyl hydroperoxide (t-BHP) in water (oxidant) and the second is a 3% (by weight) solution of sodium formaldehyde sulfoxylate (SFS) in water (reductant), both 53.33 parts total. With the reactor at 60° C. simultaneous feeds (time zero) of the t-BHP and SFS solutions were started at 0.44 parts/minute (both 120 minute feed times) and the monomer emulsion at 16.67 parts/minute (a 60 minute feed time). The reactor temperature was maintained at 60° C. for the entire polymerization process. At the end of the monomer feed (total reaction time 60 minutes from time zero) the t-BHP and SFS continued for another 60 minutes (total reaction time 120 minutes from time zero). The reaction was then cooled to 40° C. and filtered through cheesecloth. The emulsion particle size was measured to be 58 nm (by light scattering), the solids content was 30.5% (by gravimetry) and the residual BA and MMA monomers were both <10 ppm (by headspace gas chromatography). The polymer formed is identified as Example 8 in Table 1 below.

The other examples were prepared by the same process described above and varying the ratio of crosslinker (ALMA) to chain transfer agent (BMP) to determine whether a branched polymer was formed and the extent of unreacted pendent double bonds in the branched polymer. The glass transition temperature in ° C. was determined by differential scanning calorimetry (DSC) and solubility was determined in tetrahydrofuran (THF). The results (average of at least 2 samples each) are shown below in Table 1. In Table 1, DP refers to the degree of polymerization, i.e., the number of units for each monomer. The number average molecular weight, $M_n$, was determined by GPC.

TABLE 1

| | BMP | | ALMA | | MMA | | Tg | THF | |
|---|---|---|---|---|---|---|---|---|---|
| Example | wt % | DP | wt % | DP | wt % | DP | (C.) | (%) | Mn |
| 1 | 3 | 1 | 3 | 1.3 | 94 | 51 | 100 | 98 | 4248 |
| 2 | 3 | 1 | 10 | 4.3 | 87 | 47 | 106 | 14 | |
| 3 | 10 | 1 | 3 | 0.4 | 87 | 14 | 43 | 97 | 1662 |
| 4 | 10 | 1 | 10 | 1.3 | 80 | 13 | 47 | 96 | 2263 |
| 5 | 0 | 0 | 0 | 0 | 100 | high | 116 | 96 | |
| 6 | 0 | 0 | 6.5 | xl | 93.5 | xl | 129 | 6 | |
| 7 | 6.5 | 1 | 0 | 0 | 93.5 | 23 | 69 | 97 | 2042 |
| 8 | 6.5 | 1 | 6.5 | 1.3 | 87 | 22 | 75 | 97 | 2857 |
| 9 | 6.5 | 1 | 1.55 | 0.3 | 92 | 23 | 71 | 99 | 2248 |
| 10 | 6.5 | 1 | 11.5 | 2.3 | 88.6 | 20 | 80 | 41 | |
| 11 | 1.55 | 1 | 6.5 | 5.4 | 92 | 96 | 115 | 14 | |
| 12 | 11.5 | 1 | 6.5 | 0.7 | 88.6 | 12 | 39 | 99 | 1697 |

As indicated by their low solubility in THF, Examples 2, 6, 10, and 11 were determined to be crosslinked. Examples 1, 3, 4, 8, 9, and 12 were almost 100% soluble in THF.

NMR spectroscopic analysis was performed on Examples 4, 8, and 12 to determine the amount of unreacted pendent double bonds. The polymer compositions were determined based on their $^{13}$C NMR integrals and normalized to 100%. The amount of unreacted pendent double bounds was calculated by its double carbon at ~132.0 ppm. The branched ALMA content was estimated based on its side chain —OCH$_2$ ester carbon at ~65.0 ppm. As shown in Table 2, below, at least 80% of the pendent double bonds remained unreacted.

TABLE 2

| Example | MMA (mol %) | BMP (mol %) | ALMA (Unreacted mol %) | ALMA (Branch wt %) | Total ALMA (mol %) | % Unreacted |
|---|---|---|---|---|---|---|
| 4 | 87.4 | 7.1 | 4.5 | 1.0 | 5.5 | 81.8 |
| 8 | 91.7 | 4.3 | 3.4 | 0.6 | 4.0 | 85.0 |
| 12 | 88.3 | 7.3 | 3.6 | 0.8 | 4.4 | 81.8 |

As a comparison, NMR analysis was performed on a branched polymer comprising 5 weight percent of BMP, 2.5 weight percent 1,4-butanediol dimethacrylate (BGDMA), 5 weight percent butyl acrylate (BA), and 87.5 weight percent MMA. As expected, around 4% of the pendent double bonds were unreacted in this comparative sample.

Synthesis of Core-Shell Polymer with Allylic-Functional Shell and Preparation of Polyolefin Blend A core-shell polymer was prepared using emulsion polymerization. The first stage emulsion polymerization was carried out in a 5 liter 4-necked round bottom flask equipped with a mechanical stirrer, heating mantel, thermometer, temperature controller and N$_2$ inlet. To the reactor was charged 880 parts of deionized water, 0.41 parts of acetic acid, 2.62 parts of Na$_2$SO$_4$, 239.96 parts of an acrylic rubber preform-seed latex (32.0% latex solids, 59 nm), and 2.44 parts of sodium formaldehyde sulfoxylate (SFS). The contents of the reactor were heated to 40° C. with an Na sweep. A monomer emulsion was prepared in a separate container with 241 parts of deionized water, 72.76 parts of sodium lauryl sulfate (SLS) surfactant (28% in water), 11.36 parts of allyl methacrylate (ALMA) and 1599.03 parts of butyl acrylate (BA). Mechanical agitation was applied to effect emulsification. The total of the monomer emulsion was 1924.22 parts. With the reaction at 40° C., 711.96 parts of the monomer emulsion were added along with 1.09 parts of 70% aqueous t-butyl hydroperoxide (t-BHP). After the polymerization exotherm peaked the reaction was cooled down to 54° C. and 634.99 parts of the monomer emulsion were added along with 0.77 parts of 70% aqueous t-BHP. After the polymerization exotherm peaked the reaction was cooled down to 65° C. and 577.20 parts of the monomer emulsion were added along with 0.79 parts of 70% aqueous t-BHP. After the polymerization exotherm peaked 2 parts of 70% aqueous t-BHP and 1 part of SFS (dissolved in 50 parts of DI water) were added to the reaction. After a 15 minute hold the reaction was then cooled to 40° C. and filtered through cheesecloth. The emulsion particle size was measured to be 170 nm (by light scattering), and the solids content was 50.0% (by gravimetry).

The second stage emulsion polymerization was carried out in a 5 liter 4-necked round bottom flask equipped with a mechanical stirrer, heating mantel, thermometer, temperature controller and Na inlet. To the reactor was charged 670 parts of deionized water, 1400 parts of the acrylic rubber stage (A), (50.0% latex solids), 0.055 parts of FeSO$_4$ and 1.5 parts of methyl-β-cyclodextrin. The contents of the reactor were heated to 60° C. with an Na sweep. A monomer emulsion was prepared in a separate container with 234 parts of deionized water, 18.18 parts of DS-4 surfactant (22% in water), 53 parts of allyl methacrylate (ALMA), 696 parts of methyl methacrylate (MMA), and 52 parts of butyl 3-mercaptopropioante (BMP). Mechanical agitation was applied to effect emulsification. The total of the monomer emulsion was 1000 parts. The redox initiator system consists of 2 separate solutions. The first is a 3% (by weight) solution of t-butyl hydroperoxide (t-BHP) in water (oxidant) and the second is a 3% (by weight) solution of sodium formaldehyde sulfoxylate (SFS) in water (reductant), both 53.33 parts total. With the reactor at 60° C. simultaneous feeds (time zero) of the t-BHP and SFS solutions were started at 0.44 parts/minute (both 120 minute feed times) and the monomer emulsion at 16.67 parts/minute (a 60 minute feed time). The reactor temperature was maintained at 60° C. for the entire polymerization process. At the end of the monomer feed (total reaction time 60 minutes from time zero) the t-BHP and SFS continued for another 60 minutes (total reaction time 120 minutes from time zero). The reaction was then cooled to 40° C. and filtered through cheesecloth. The emulsion particle size was measured to be 172 nm (by light scattering), and the solids content was 39.4% (by gravimetry).

The core-shell acrylic polymer was isolated by calcium chloride coagulation. An emulsified peroxide (Luperox® 101) was added to the wetcake prior to drying.

The core-shell acrylic polymer, with the peroxide, was blended with an ethylene-octene copolymer at 30 to 50 weight percent core-shell acrylic polymer. The polymer blend was processed using a Brabender mixer, commercially available from Brabender GmbH & Co. KG of Duisburg, Germany, with operating conditions maintained at 60 RPM, 185° C., and 50 gram resin.

TABLE 3

Mechanical Properties Comparison

| Sample ID | Break Elongation (%) | Break Stress (psi) | Modulus (psi) | Crease whitening |
|---|---|---|---|---|
| INFUSE 9500 neat | 1497 | 681 | 1728 | no |
| 70% INFUSE 30% MLK6863 | 1513 | 462 | 1511 | yes |
| 70% INFUSE 30% MLK6863 0.5% LUPEROX 101 | 1098 | 763 | 1642 | no |

Note:
Type 1A tensile bar, rate: 20 in/min

What is claimed is:

1. A composition comprising:
a polyolefin polymer; and
a core-shell acrylic polymer comprising a crosslinked core and a shell comprising a branched polymer which is a reaction product of reactants comprising one or more monoethylenically unsaturated ester monomers, a chain transfer agent in an amount of 0.1 to 15 weight percent, and a crosslinker in an amount of 0.1 to 15 weight percent, wherein weight percent is based on total amount of reactants, provided the amount of crosslinker is within +/−5 weight percent of the amount of chain transfer agent, wherein the crosslinker comprises at least two carbon-carbon double bonds having different reactivity;
wherein the branched polymer is not cross-linked.

2. The composition of claim 1 wherein the one or more monoethylenically unsaturated ester monomers has the structure R'—C(O)O—R where R is a hydrocarbyl group of 1 to 12 carbon atoms and R' is a monoethylenically unsaturated aliphatic group having at least 2 carbon atoms.

3. The composition of claim 1 wherein the chain transfer agent is selected from the group consisting of propyl mercaptan, butyl mercaptan, hexyl mercaptan, octyl mercaptan, dodecyl mercaptan, thioglycolic acid, mercaptopropionic acid, alkyl thioglycollates, mercaptoethanol, mercaptoundecanoic acid, thiolactic acid, thiobutyric acid, trimethylol propane tris(3-mercaptopropionate), pentaerythritol tetra(3-mercaptopropionate), pentaerythritol tetrathioglycollate, pentaerythritol tetrathiolactate, pentaerythritol tetrathiobutyrate; dipentaerythritol hexa (3-mercaptopropionate), dipentaerythritol hexathioglycollate; tripentaerythritol octa (3-mercaptopropionate), tripentaerythritol octathioglycollate, butyl 3-mercaptopropioante and combinations of two or more thereof.

4. The composition of claim 1 wherein the crosslinker is selected from the group consisting of allyl methacrylate, allyl acrylate, and combinations thereof.

5. The composition of claim 1 wherein the core shell acrylic polymer comprises 10 to 50 weight percent based on the total weight of the polyolefin polymer and the core-shell acrylic polymer.

6. The composition of claim 1 wherein the crosslinked core is the reaction product of butyl acrylate and allyl methacrylate.

7. The composition of claim 1 wherein the polyolefin is an ethylene-octene copolymer.

8. The composition of claim 1 wherein the amount of crosslinker is within +/−3 weight percent the amount of chain transfer agent.

9. The composition of claim 1 wherein the branched polymer further comprises lauryl methacrylate.

10. The composition of claim 1 wherein the core-shell acrylic polymer is grafted to the polyolefin polymer.

11. A method of preparing a composition according to claim 1 wherein the core-shell acrylic polymer is blended with the polyolefin polymer.

12. The method of claim 11 wherein the core-shell acrylic polymer is coagulated in the presence of a high temperature thermal peroxide prior before the core shell acrylic polymer is blended with the polyolefin polymer.

13. An article formed from the composition according to claim 1.

14. A composition comprising:
a polyolefin polymer; and
a core-shell acrylic polymer comprising a crosslinked core and a shell comprising a branched polymer which is a reaction product of reactants comprising one or more monoethylenically unsaturated ester monomers, a chain transfer agent in an amount of 0.1 to 15 weight percent, and a crosslinker in an amount of 0.1 to 15 weight percent, wherein weight percent is based on total amount of reactants, provided the amount of crosslinker is within +/−5 weight percent of the amount of chain transfer agent, wherein the crosslinker comprises at least two carbon-carbon double bonds having different reactivity;
wherein the polyolefin comprises an ethylene-octene copolymer.

15. A composition comprising:
a polyolefin polymer; and
a core-shell acrylic polymer comprising a crosslinked core and a shell comprising a branched polymer which is a reaction product of reactants comprising one or more monoethylenically unsaturated ester monomers, a chain transfer agent in an amount of 0.1 to 15 weight percent, and a crosslinker in an amount of 0.1 to 15 weight percent, wherein weight percent is based on total amount of reactants, provided the amount of crosslinker is within +/−5 weight percent of the amount of chain transfer agent, wherein the crosslinker comprises at least two carbon-carbon double bonds having different reactivity;

wherein the core-shell acrylic polymer is grafted to the polyolefin polymer.

* * * * *